(12) United States Patent
Mandryk

(10) Patent No.: US 8,776,091 B2
(45) Date of Patent: Jul. 8, 2014

(54) REDUCING FEEDBACK LATENCY

(75) Inventor: Luciano Baretta Mandryk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 12/771,286

(22) Filed: Apr. 30, 2010

(65) Prior Publication Data

US 2011/0271281 A1 Nov. 3, 2011

(51) Int. Cl.
*G06F 3/00* (2006.01)

(52) U.S. Cl.
USPC ............................ 719/328; 719/313; 719/320

(58) Field of Classification Search
CPC ... H04W 4/02; H04W 24/02; H04W 52/0206; H04L 45/306; H04L 45/64; H04L 63/164; H04L 63/166; H04L 65/60; H04L 69/32; H04L 69/324; H04L 69/325; H04L 69/326; H04L 69/329; G06F 13/1652; G06F 17/03
See application file for complete search history.

(56) References Cited

U.S. PATENT DOCUMENTS

| | | | |
|---|---|---|---|
| 5,043,868 A | 8/1991 | Kitamura | |
| 5,754,737 A | 5/1998 | Gipson | |
| 5,900,004 A | 5/1999 | Gipson | |
| 6,574,272 B1 | 6/2003 | Peace | |
| 7,137,126 B1 * | 11/2006 | Coffman et al. | 719/328 |
| 7,185,182 B2 | 2/2007 | Col | |
| 7,259,758 B2 | 8/2007 | Yee | |
| 7,681,201 B2 * | 3/2010 | Dale et al. | 719/313 |
| 2002/0191029 A1 * | 12/2002 | Gillespie et al. | 345/810 |
| 2003/0101291 A1 * | 5/2003 | Mussack et al. | 709/328 |
| 2006/0031567 A1 * | 2/2006 | Aoki et al. | 709/235 |
| 2008/0148275 A1 * | 6/2008 | Krits et al. | 719/313 |
| 2008/0168402 A1 * | 7/2008 | Blumenberg | 715/863 |
| 2009/0100257 A1 * | 4/2009 | Sandmel et al. | 713/100 |
| 2009/0228987 A1 | 9/2009 | Van Gogh | |
| 2009/0265777 A1 * | 10/2009 | Scott | 726/11 |
| 2010/0077475 A1 * | 3/2010 | Deschenes et al. | 726/21 |
| 2010/0235118 A1 * | 9/2010 | Moore et al. | 702/57 |

OTHER PUBLICATIONS

Hybinette et al., "Latency Hiding with Optimistic Computations," Mar. 2002, http://portal.acm.org/citation.cfm?id=589755, 3 pp. (Abstract).

"User Interface Customization," retrieved Feb. 1, 2010 from http://www.bitmanagement.de/developer/?page=/contact/ui/index.html, 12 pp.

* cited by examiner

*Primary Examiner* — Tuan Dao

(74) *Attorney, Agent, or Firm* — Andrew Sanders; Micky Minhas

(57) ABSTRACT

A latency between an input and its corresponding feedback can be reduced by generating the feedback in a lower-layer software component instead of in an upper-layer software component. The lower-layer component generates the feedback based on one or more parameters associated with a given input type. The parameters were previously created based on, for example, one or more previous inputs. Generating feedback in a lower-layer component reduces the number of software layer boundaries that the input and feedback pass through, thus reducing the latency between the feedback and input.

14 Claims, 7 Drawing Sheets

REDUCING FEEDBACK LATENCY

FIELD

The disclosed technologies generally relate to generating feedback for computer systems (e.g., computer graphics systems).

BACKGROUND

When a computer system receives an input, the computer takes a certain amount of time to generate corresponding feedback for the input. Accordingly, this feedback sometimes exhibits a latency. As a result, for example, an input-driven, animated user interface element can feel less "natural" to a user because the element appears slow to respond to the user's input.

SUMMARY

A latency between an input and its corresponding feedback can be reduced by generating the feedback in a lower-layer software component instead of in an upper-layer software component. The lower-layer component generates the feedback based on one or more parameters associated with a given input type. In at least some embodiments, the parameters were previously created based on one or more previous inputs. Generating feedback in a lower-layer component reduces the number of software layer boundaries that the input and feedback pass through, thus reducing the latency between the feedback and input.

Some embodiments of a computer-implemented method comprise determining feedback for input data received at a lower-layer software component in a software system, the system comprising a plurality of software layers, the feedback being determined based at least in part on one or more feedback parameters and using the lower-layer software component, the one or more feedback parameters having been provided by an upper-layer software component in the system prior to the receipt of the input data by the lower-level software component. The method further comprises receiving the one or more feedback parameters from the upper-layer software component using the lower-layer software component. In some cases, the feedback parameters have been determined by the upper-layer software component based at least in part on previous input data for which previous feedback was determined. In some cases, the feedback parameters have been provided by the upper-layer software component in response to starting the software system, accessing a document with the software system, or using a user interface with the software system. The method further comprises modifying a user interface element on an electronic device display based at least in part on the feedback determined using the lower-layer software component. In some cases, the upper-layer software component and the lower-layer software component execute in different threads and/or processes. The one or more feedback parameters can comprise at least one of a group consisting of an inertia parameter, a boundary parameter and a boundary feedback parameter. The method further comprises determining that the feedback parameters are available for the received input data. In some embodiments, the lower-layer software component executes on a first computer and the upper-layer software component executes on a second computer. Sometimes the feedback can be determined without sending the input data to the upper-layer software component. In some embodiments, the one or more feedback parameters have been further determined by a software component operating in a software layer between a layer in which the lower-layer software component operates and a layer in which the upper-layer software component operates. The method further comprises providing at least a portion of the input data to the upper-layer software component, possibly providing only some of the input data to the upper-layer software component.

Some embodiments of a system comprise: a processor; and one or more computer-readable media having encoded thereon instructions which, when executed by the processor, cause the processor to perform a method, the method comprising, generating feedback for a user interface element, the feedback being generated in a first software component for a later input based at least in part on one or more feedback parameters provided by a second software component, the feedback parameters having been provided based on an earlier input and before receipt by the system of the later input, wherein exchanging data between the first and second software components requires crossing one or more thread boundaries. The method further comprises generating the feedback parameters using the second software component. The first software component and the second software component can execute in separate software layers in the system, the separate software layers having different abstraction levels. The method can further comprise executing a default behavior for an input for which a corresponding feedback parameter is unavailable.

Some embodiments of one or more computer-readable media have encoded thereon instructions which, when executed by a computer, cause the computer to perform a method in a system having at least an upper software layer and a lower software layer, the method comprising: receiving, at the upper software layer, a description of a first user input of a given type, the upper software layer comprising an application layer; generating, using the upper software layer, one or more transformations for producing feedback corresponding to the first user input of the given type; passing the generated one or more transformations to the lower software layer, the lower software layer comprising a rendering layer; receiving, at the lower software layer, a description of a second user input of the given type; and generating, using the lower software layer, feedback for the second user input of the given type based at least on part on the generated one or more transformations. Sometimes only a portion of the second user input of the given type is passed to the upper software layer.

The foregoing and other features of the disclosed technologies will become more apparent from the following detailed description, which proceeds with reference to the accompanying figures.

DETAILED DESCRIPTION

Figure 1:
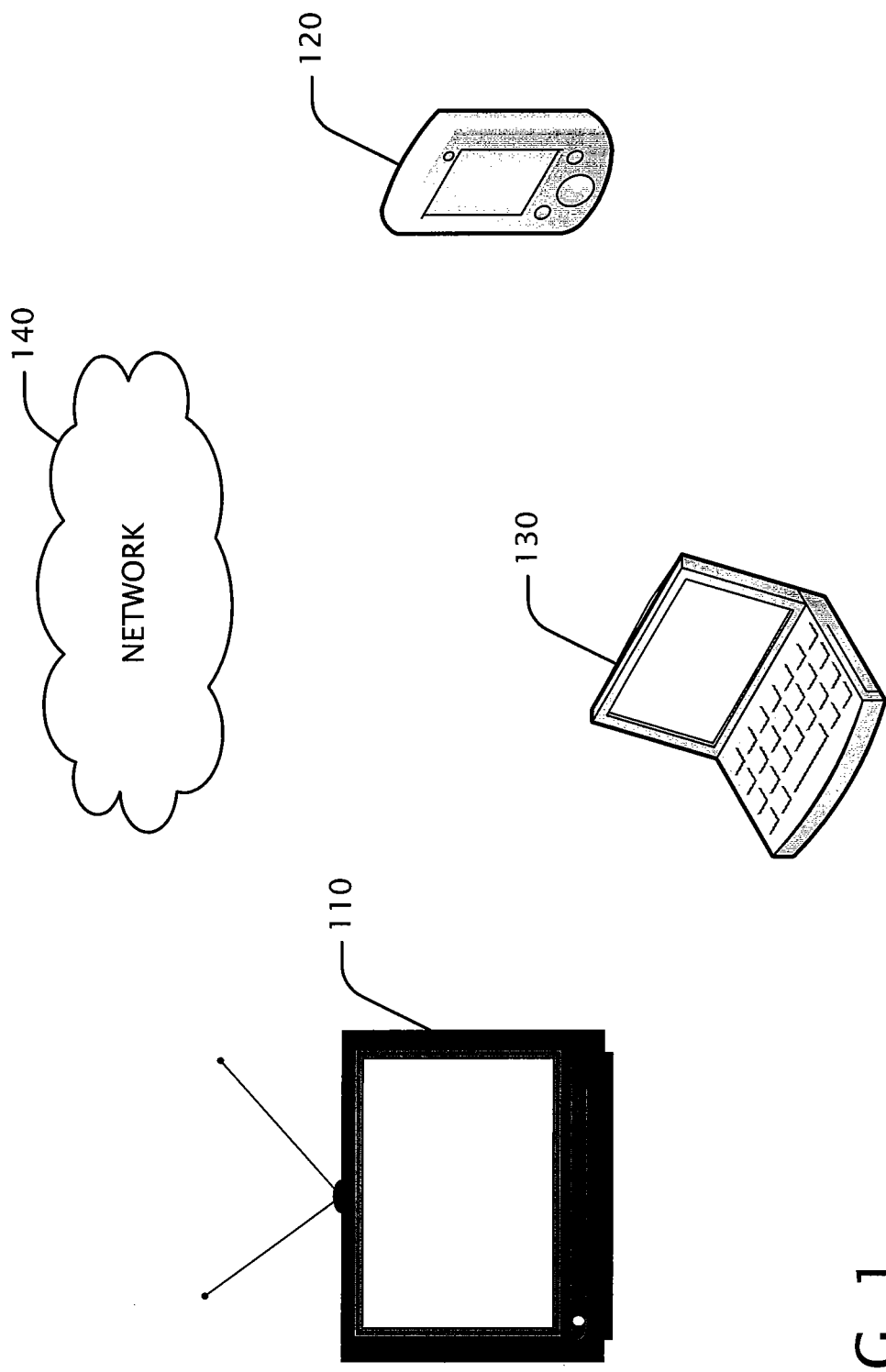
FIG. 1 shows exemplary embodiments of one or more devices which can be used with at least some of the disclosed technologies.

Disclosed below are embodiments of computer system technologies and/or related systems and methods. The embodiments should not be construed as limiting in any way. Instead, the present disclosure is directed toward all novel and nonobvious features and aspects of the various disclosed methods and systems, and equivalents thereof, alone and in various combinations and subcombinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "receive," "determine" and "generate" to describe the disclosed technology. These and other terms are high-level abstractions of the actual operations that are performed. The actual operations that correspond to these terms may vary depending on the particular implementation and are readily discernible by one of ordinary skill in the art.

Any of the methods described herein can be performed using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (for example, via the Internet, a wide-area network, a local-area network, a client-server network, or other such network). Computer-readable media do not include pure signals that are disembodied from a physical medium.

The software embodiments disclosed herein can be described in the general context of computer-executable instructions, such as those included in program modules, which can be executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment. For clarity, only certain selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware (e.g., an ASIC, PLD, or SoC). Portions of one or more disclosed methods can be executed by different parts of a distributed computing environment.

Additionally, intermediate or final results (e.g., feedback information), created or modified using any of the disclosed methods can be stored on one or more tangible computer-readable storage media. In some cases, intermediate or final results, produced by any of the disclosed methods, can be presented to a user using a suitable device (e.g., a computer monitor, a speaker). Such presentation and/or storing can be performed as part of a computer implementation of any of the disclosed methods.

Furthermore, any of the software embodiments (comprising, for example, computer-executable instructions for causing a computer to perform any of the disclosed methods) can be transmitted, received, or accessed through a suitable communication means. Similarly, intermediate or final method results, created or modified using any of the disclosed methods, can be transmitted, received, or accessed through a suitable communication means. Such suitable communication means include, for example, the Internet, the World Wide Web, an intranet, cable (including fiber optic cable), magnetic communication means, electromagnetic communication means (including RF, microwave, and infrared communications), electronic communication means, or other such communication means. Such communication means can be, for example, part of a shared or private network.

FIG. 1 shows exemplary embodiments of one or more devices which can be used with at least some of the disclosed technologies, including a television or other display device 110 (possibly acting in conjunction with a digital set-top box (not shown)), a handheld or portable computing device 120 (e.g., a personal digital assistant (PDA), a cell phone, a smartphone, a portable music or video player) and a personal computer 130 (e.g., a desktop computer, a laptop computer, a netbook, a server, a thin client). In particular embodiments, two or more of the devices 110, 120, 130 are used in combination with one or more of the disclosed technologies. For example, the handheld computing device 120 can be used to control images displayed on the television or other display device 110. Any of the devices 110, 120, 130 can be configured to receive data from and/or transmit data to a network 140.

Figure 2:
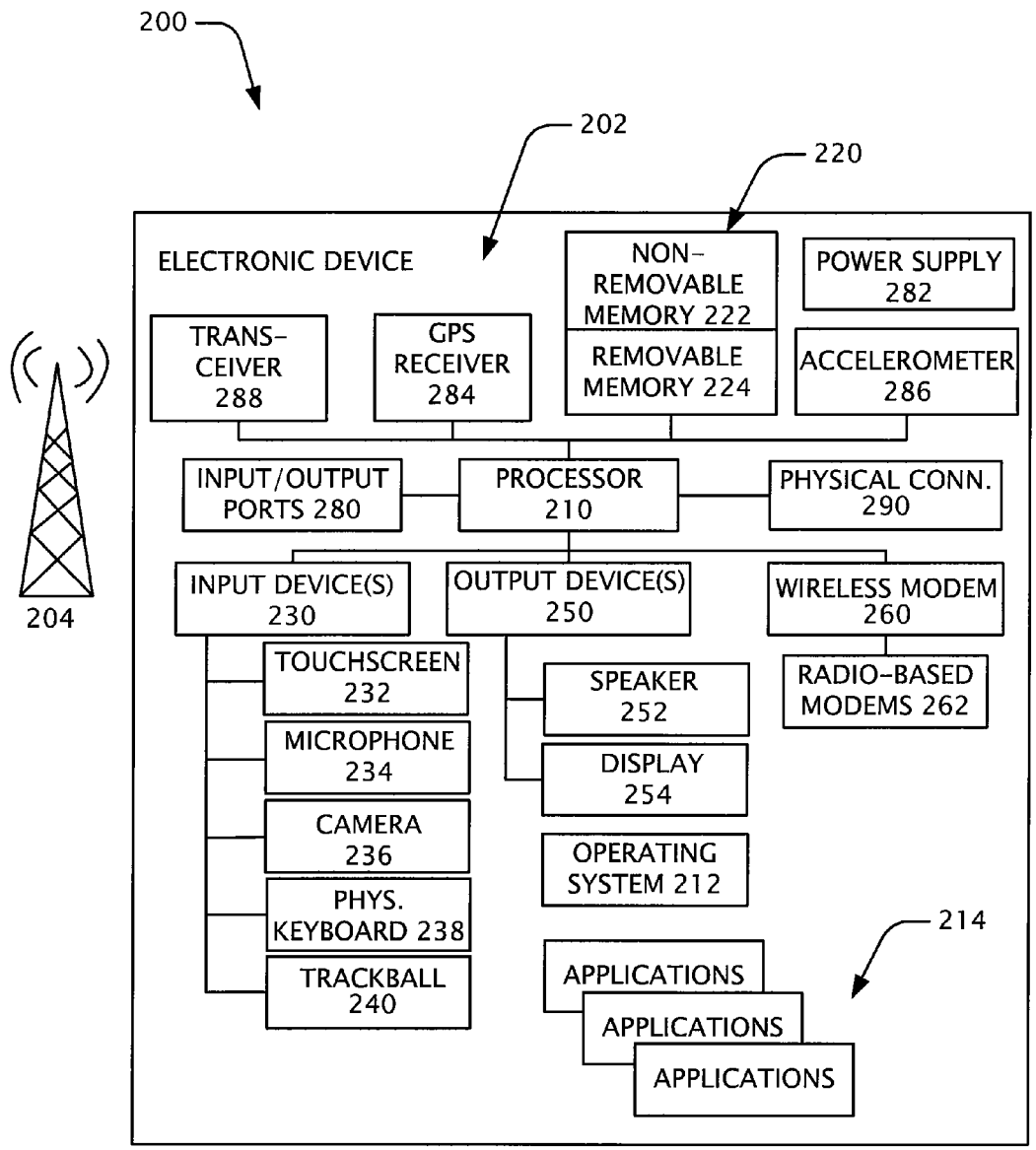
FIG. 2 shows a block diagram of an exemplary electronic device.

FIG. 2 is an exemplary electronic device 200 including a variety of optional hardware and software components, shown generally at 202. Any of the components 202 in the device 200 can communicate with any other component, although not all connections are shown, for ease of illustration. The device 200 can be any of a variety of devices described herein and can allow wireless two-way communications with one or more mobile communications networks 204, such as a cellular or satellite network. The illustrated device can include a controller or processor 210 (e.g., signal processor, microprocessor, ASIC, or other control and processing logic circuitry) for performing such tasks as signal coding, data processing, input/output processing, power control and/or other functions necessary for implementing the device. An operating system 212 can control the allocation and usage of the components 202 and provide support for one or more application programs 214. The application programs 214 typically include e-mail applications, calendars, contact managers, web browsers, text and media messaging applications. The application programs 214 and/or the operating system 212 can also implement embodiments of one or more methods disclosed herein. Memory 220 can include non-removable memory 222 and/or removable memory 224. The non-removable memory 222 can include RAM, ROM, flash memory, a hard disk, or other well-known memory storage technologies and can be used for storing data and/or code for running the operating system 212 and the application programs 214. Example data can include web pages, text, images, sound files, video data, feedback instructions or other data sets transferable to and from one or more network servers or other devices via one or more wired or wireless networks. The removable memory 224 can include flash memory or a Subscriber Identity Module (SIM) card, which is well known in GSM communication systems, or other well-known memory storage technologies, such as "smart cards." The memory 220 can be used to store a subscriber identifier, such as an International Mobile Subscriber Identity (IMSI) and an equipment identifier, such as an International Mobile Equipment Identifier (IMEI). Such identifiers can be transmitted to a network server to identify users and equipment.

The device 200 can support one or more input devices 230, such as a touch screen 232, microphone 234, camera 236, physical keyboard 238 and/or trackball 240 and one or more output devices 250, such as a speaker 252 and/or a display 254. Other possible output devices (not shown) can include piezoelectric or other haptic output devices. A wireless modem 260 can be coupled to an antenna (not shown) and can support two-way communications between the processor 210 and external devices, as is well understood in the art. The modem 260 is shown generically and can include a cellular modem for communicating with the mobile communication network 204 and/or other radio-based modems 262 (e.g., Bluetooth or Wi-Fi). The wireless modem 260 is typically configured for communication with one or more cellular networks, such as a GSM network for data and voice communications within a single cellular network, between cellular networks, or between the device and a public switched telephone network (PSSTN). The device can further include at least one input/output port 280, a power supply 282, a satellite navigation system receiver 284 (such as a Global Positioning System (GPS) receiver), an accelerometer 286, a transceiver 288 (for wirelessly transmitting analog or digital signals) and/or a physical connector 290, which can be a USB port, IEEE 1394 port, LAN port, and/or RS-232 port. Further embodiments can include a wired modem (not shown). The illustrated components 202 are not required or all-inclusive, as any components can be deleted and other components can be added.

At least some embodiments herein are described in the context of a software architecture that employs multiple "layers" or "software layers." A layer is loosely defined as a set of one or more software systems or sub-systems having the same or approximately the same level of abstraction (e.g., in terms of interacting with hardware components and/or other software components). In many cases, at least some layers in such an architecture are built "on top" of another layer; that is, a first layer with a first, higher degree of abstraction is configured to exchange information with a second layer having a second, lower degree of abstraction (the first layer operating "on top" of the second layer). The exchange of information between the first and second layers can be direct or through an intermediate layer.

An "upper" or "higher" layer operates more specific to a given application, and a "lower" layer is less specific to that application. In other words, behavior specialization increases with higher layers in a system, while generalization increases with lower layers in the system. For example, an upper layer often contains one or more components which make decisions and/or perform functions for the application. Often, the decisions are made and/or the functions are performed at least partially independent of other hardware and/or software components in the system. As an example, an e-mail client may exist in an upper layer and be programmed to handle data representing an e-mail message. The client receives the data from lower layers, though the lower layers are not configured to interpret the data.

Generally speaking, a layer architecture insulates upper layers from lower layers. A lower layer contains one or more components which (in communication with the upper layer) implement or aid in implementing the decisions made in the upper layer (e.g., for a particular hardware and/or software configuration in the system), usually indirectly through services provided to the upper layer. In other words, a lower layer provides a set of services that can be used by an upper layer to realize one or more tasks. For example, a "rendering layer" can comprise a set of components having a given level of abstraction and can provide some or all drawing services for a system (e.g., for displaying user interface elements). Thus, a layer above the rendering layer can rely on the rendering layer to provide drawing services regardless of the structure or operation of any layers that may be below the rendering layer.

Various embodiments of the disclosed technologies can comprise any number of layers. Two or more layers in a system can have the same "level" (e.g., be equally "high" or "low"). For purposes of this application and the claims, a software component operating in an upper layer is sometimes called an "upper-layer software component," and a software component operating in a lower layer is sometimes called a "lower-layer software component." Generally speaking, a layer provides services to a layer above it (if any) and receives services from a layer below it (if any).

One example of a layer-based software architecture is the Windows® Phone 7 user interface framework and rendering system from Microsoft Corporation. Another example is Microsoft® Silverlight® with an application running on top of Silverlight®. A further example is Microsoft® DirectX® when used with Microsoft® XNA®.

Figure 3:
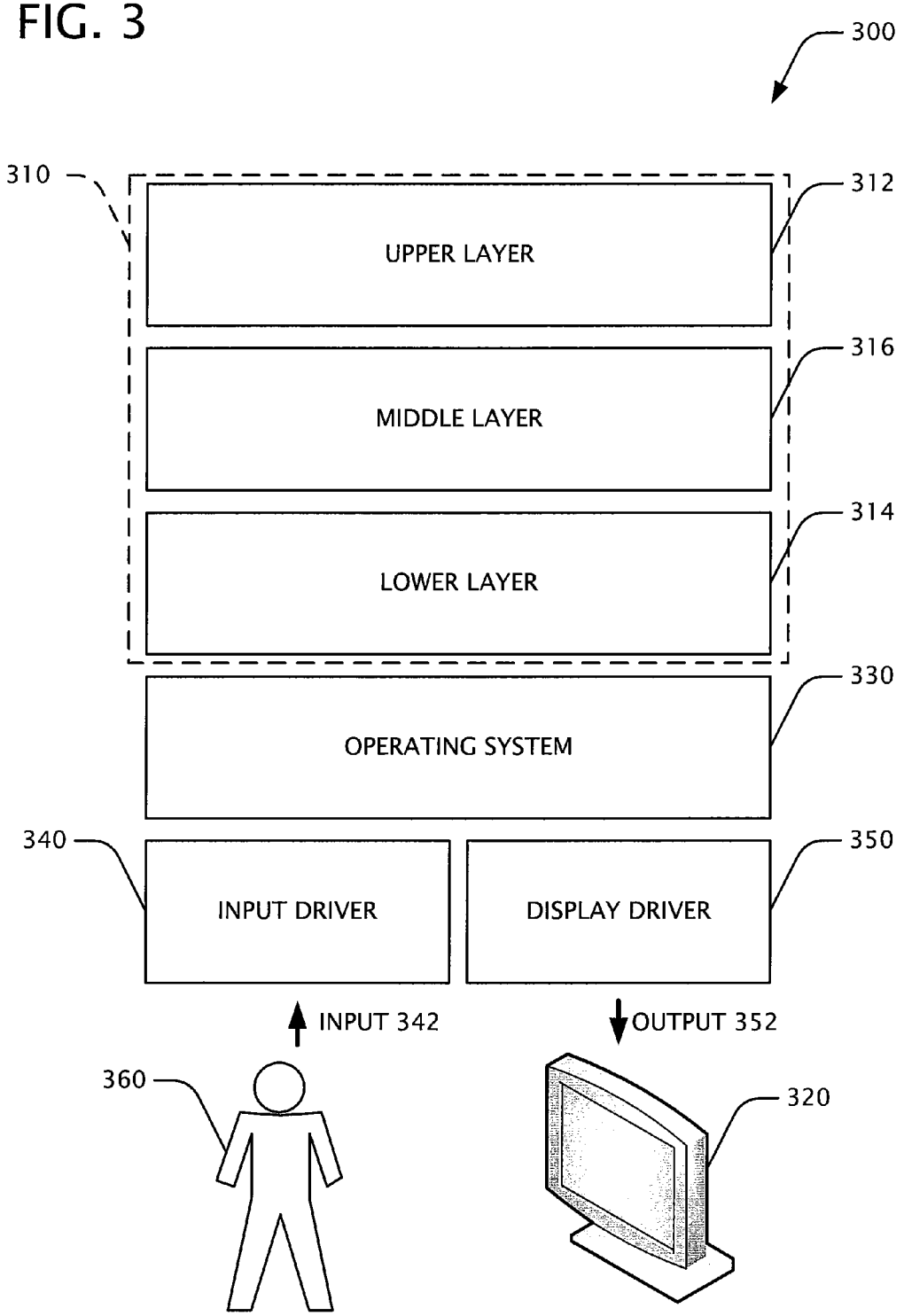
FIG. 3 shows a block diagram of an exemplary embodiment of a software system.

FIG. 3 shows a block diagram of an exemplary embodiment of a software system 300 that uses software layers. More particularly, the system 300 comprises a plurality of layers 310, which (for this example, at least) collectively form an application. In the depicted embodiment, the layers 310 comprise an upper layer 312, a middle layer 316 and a lower layer 314. Further embodiments comprise more or fewer layers. In FIG. 3, the upper layer 312 is shown positioned above the layers 314, 316 to indicate that the layer 312 is higher than the layers 314, 316. In at least some embodiments, the upper layer 312 comprises an application layer and performs, for example, higher-level decision-making functions. The lower layer 314 comprises, for example, a rendering layer that draws one or more elements (e.g., one or more graphic elements) for a hardware display 320. The middle layer 316 can perform one or more functions for a framework, such as user interface controls and/or services (e.g., layout, markup and scripting of user interface elements). In further embodiments, one or more of the layers 310 can perform one or more other functions.

The system 300 further comprises an operating system layer 330, which can be configured to provide one or more functions and services found in various operating systems, including managing memory and disk access, managing different processes (instances of a given program), managing device drivers, etc. The depicted embodiment of the system 300 also comprises an input driver layer 340 and an output driver layer 350. The layers 340, 350 handle input and output, respectively, for the system 300. FIG. 3 shows an input 342 being provided to the system 303 from a human user 360, but in various embodiments the input 342 can be provided by a number of other sources (e.g., a computer, a sensor, another electronic device). FIG. 3 also shows an output 352 being provided to the display 320, but in various embodiments the output 352 can be provided to a number of other devices (e.g., a speaker, a computer-readable medium, an analog recording device). In some embodiments, each of the layers in the system 300 executes in a different process or thread. In further embodiments, two or more layers can execute in a common process or thread.

In many embodiments, a layer-based software system (such as the system 300) incurs a time penalty when information is passed from one layer to the next. Generally, the total delay for passing information increases with the number of layers through which the information is passed and the technology used for passing information between the layers. For example, in FIG. 3, passing information from the lower layer 314 to the middle layer 316 requires a certain amount of time. Passing that information from the middle layer 316 to the upper layer 312 requires an additional amount of time. Also, a communication method such as a direct procedure call is generally much faster than marshalling data across thread or process boundaries or sending data across a network.

Figure 4:
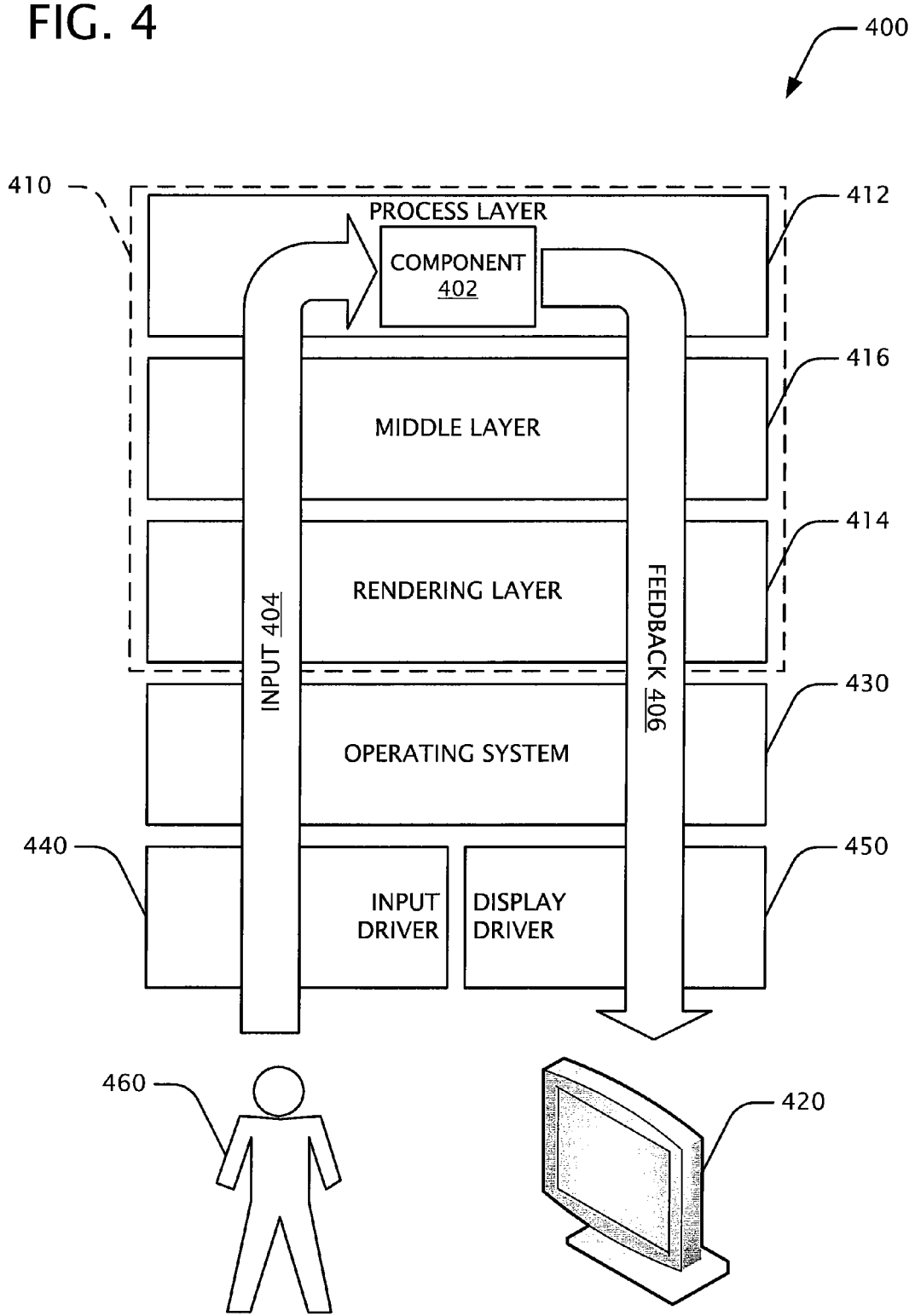
FIG. 4 shows a block diagram of an exemplary embodiment of a software system generating feedback for input.

FIG. 4 shows a block diagram of an exemplary embodiment of a software system 400, which bears at least some similarities to the system 300 described above. The system 400 is configured to receive an input 404 (e.g., from a user 460) using an input driver layer 440. At least a portion of the input 404 is passed from the input driver layer 440 to one or more other layers in the system 400. For example, the input 404 can be passed serially from the input driver layer 440 to the operating system layer 430, then to the rendering layer 414, then to the middle layer 416, and finally to the process (application) layer 412. In some cases, the middle layer 416 provides functions for a user interface framework.

In the application layer 412, one or more components 402 determine feedback 406 for the input 404. The feedback 406 can comprise one or more instructions or data determined based at least in part on the input 404. For example, if the input 404 comprises a hardware input associated with a scrolling of an image on a display 420, then the feedback 406 can comprise one or more instructions or data configured to cause a display driver layer 450 to display the image as scrolled (i.e., moved) on the display 420.

Generally, passing the input 404 and the feedback 406 between multiple layers introduces one or more delays between the receiving of the input 404 and the providing of the feedback 406. As mentioned above, delays between input and feedback can increase latency and reduce the responsiveness of the system 400 by, for example, making the system appear slow to respond to the input. In some cases (e.g., when the feedback 406 is related to a user-interface element), this reduction in responsiveness can make using the system 400 less satisfying for the user 460.

Figure 5:
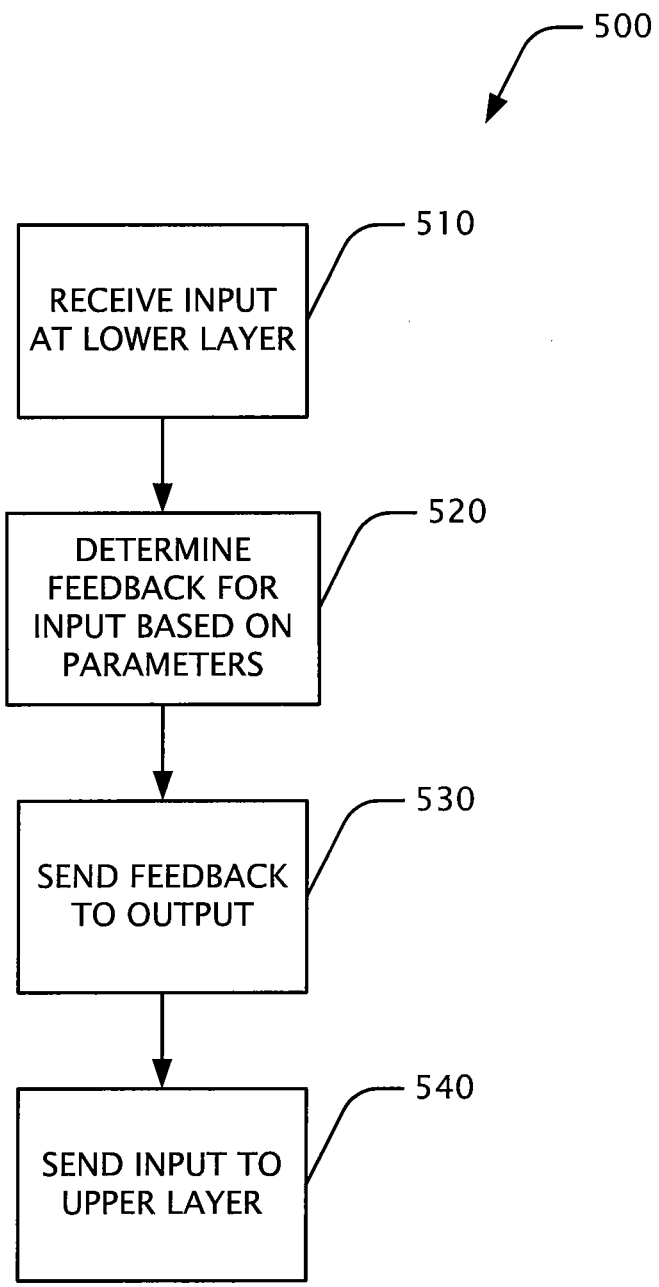
FIG. 5 shows a block diagram of an exemplary embodiment of a method for reducing feedback latency.

FIG. 5 shows a block diagram of an exemplary embodiment of a method 500 for reducing feedback latency. The method 500 can be used with a software system comprising multiple layers, with a process for an application executing in a higher layer. In a method act 510, input data is received in a lower software layer (i.e., lower than the layer in which the process for the application is executing). In a method act 520, feedback is determined for at least a portion of the received input data based on one or more parameters. (Exemplary parameters are described below in more detail.) In a method act 530, the determined feedback is sent to one or more outputs (e.g., a display driver). Since the input does not need to travel to the higher layer for the feedback to be determined, and since the feedback travels to the one or more outputs from a lower layer instead of from a higher layer, latency between receiving the input and providing the feedback is generally reduced. In further embodiments, at least a portion of the input data is also sent to one or more other layers (e.g., the higher layer in which the application is executing) in a method act 540.

Figure 6:
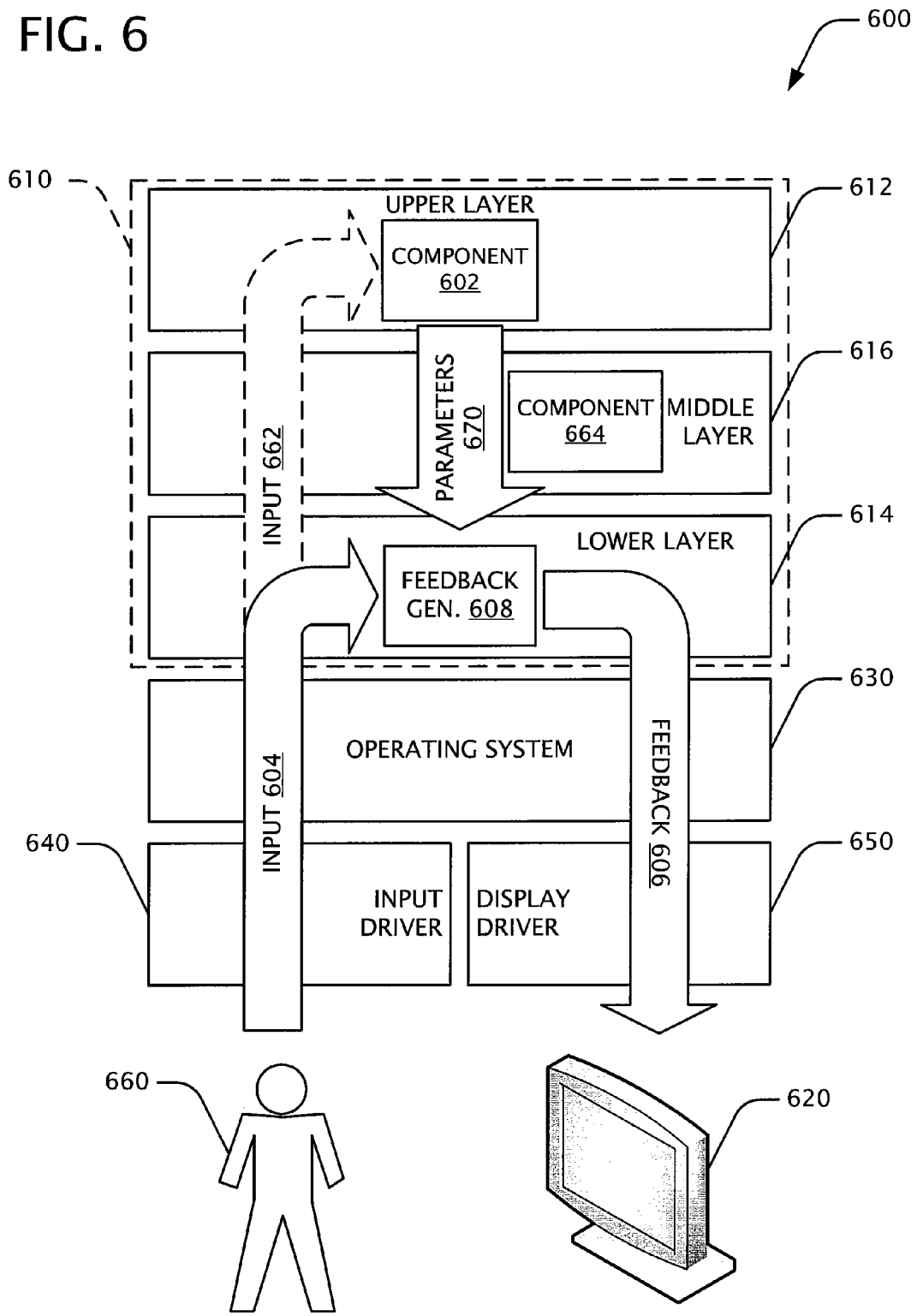
FIG. 6 shows a block diagram of an exemplary embodiment of a software system.

The method of FIG. 5 can be understood more clearly with reference to FIG. 6. FIG. 6 shows a block diagram of an exemplary embodiment of a software system 600 comprising a plurality of layers 610, including an upper layer 612, a middle layer 616 and a lower layer 614. The system 600 further comprises an operating system layer 630, an input driver layer 640 and a display driver layer 650. In some embodiments, the upper layer 612 comprises an application layer and the lower layer 614 comprises a rendering layer. The layers 610 form an application.

When using the system 600 (employing, for example, embodiments of the method 500), one or more inputs 604 can be provided to the system 600, possibly from a user 660. In some cases, the one or more inputs 604 comprise an input stream, which comprises a plurality of individual inputs received within a given timeframe. For example, a user moving a finger across a touch-sensitive input device would produce an input stream that includes a number of inputs (e.g., corresponding to different positions of the finger on the input device). In further embodiments, the one or more inputs 604 comprise one or more individual inputs (e.g., individual keystrokes or mouse clicks).

The inputs 604 are passed to a lower layer in the system 600 (e.g., to the lower layer 614), possibly by one or more other components or layers (e.g., the operating system layer 630 and the input driver layer 640). A feedback generation component 608, operating in the lower layer 614, receives the input 604 and generates the corresponding feedback 606 based at least in part on one or more parameters 670 (sometimes also called "transformations" or "transform instructions"). The parameters 670 were provided earlier to the feedback generation component 608, possibly by a component 602 in the upper layer 612. Generally, the parameters 670 were determined before the receipt of the input 604 by the lower layer 614.

In some embodiments, two or more feedback generation components 608 operate in the lower layer 614. The different instances of the components 608 provide feedback for different input types, possibly using different sets of parameters 670. The multiple components 608 can be configured to provide feedback for a given input stream, possibly by being associated with the particular stream using a stream identifier (stream ID). In further embodiments, different instances of the feedback generation component 608 provide feedback for different user interface elements (e.g., different lists that can be scrolled independent of each other). The instances of the component 608 can use the same or different sets of parameters 670.

In at least some embodiments, the parameters 670 were generated in response to a prior input (e.g., similar to the input 604, though not necessarily identical), possibly a portion of an input stream. The parameters 670 can be generated by the component 602 in the upper later 612. In some cases, the parameters 670 are further modified by the component 664 in the middle layer 616 before the parameters 670 are provided to the component 608. Multiple components 602, 664 create the parameters 670 if, for example, the components 602, 664 have access to different information for the feedback. For example, in some cases information in the upper layer 612 is available to the component 602, but not to the component 664 in the middle layer 616. There can also be information available to the component 664 that is unavailable to the component 602.

In further embodiments, at least some of the parameters 670 were not generated in response to a prior input to the system 600. Instead, the parameters 670 were provided to the component 608 (possibly by the component 602) as a result of another event. Such events include, for example: starting the system 600, the operating system, or the application; using one or more user interfaces with the system 600; accessing certain lists, web pages or other documents using the system 600; or other events. In such cases, the parameters 670 can be seen as "generic" parameters for their respective events that were prepared and stored in advance.

The feedback 606 is passed to one or more layers (e.g., layers 630, 650). In some cases, the feedback 606 is also passed (directly or indirectly) to an output device, such as a display 620.

A comparison of the systems 400 and 600 in FIGS. 4 and 6 provides a visual example of how methods such as the method 500 can reduce feedback latency for inputs to a computer system. Compared to the system 600, the input for the system 400 is passed among two additional layers before the corresponding feedback is generated, and the feedback itself is passed among two additional layers before reaching its destination (e.g., an output device such as a display). These four additional layer crossings in the system 400 incur time and processing penalties which increase feedback latency relative to the system 600.

Particular embodiments pass at least some of the input 604 (possibly a subset 662 of the input 604) to the upper layer 612, even though the feedback generation component 608 produces the actual feedback 606. For example, touch input on a touch screen often generates about 30 to 400 inputs per second. To reduce the amount of information passed to the upper layer 612, out of these inputs about 1 input per second is sent to the upper layer 612. This allows the upper layer 612 to receive some information about the input 604 and be updated about the status of the system 600.

In further embodiments, if the feedback generation component 608 receives an input for which the component 608 does not have corresponding feedback parameters, the component 608 generates feedback according to one or more default behaviors. For embodiments employing input streams, an example default behavior is using one or more parameters from a previous stream for a later stream (e.g., for two scroll-list input streams).

Figure 7:
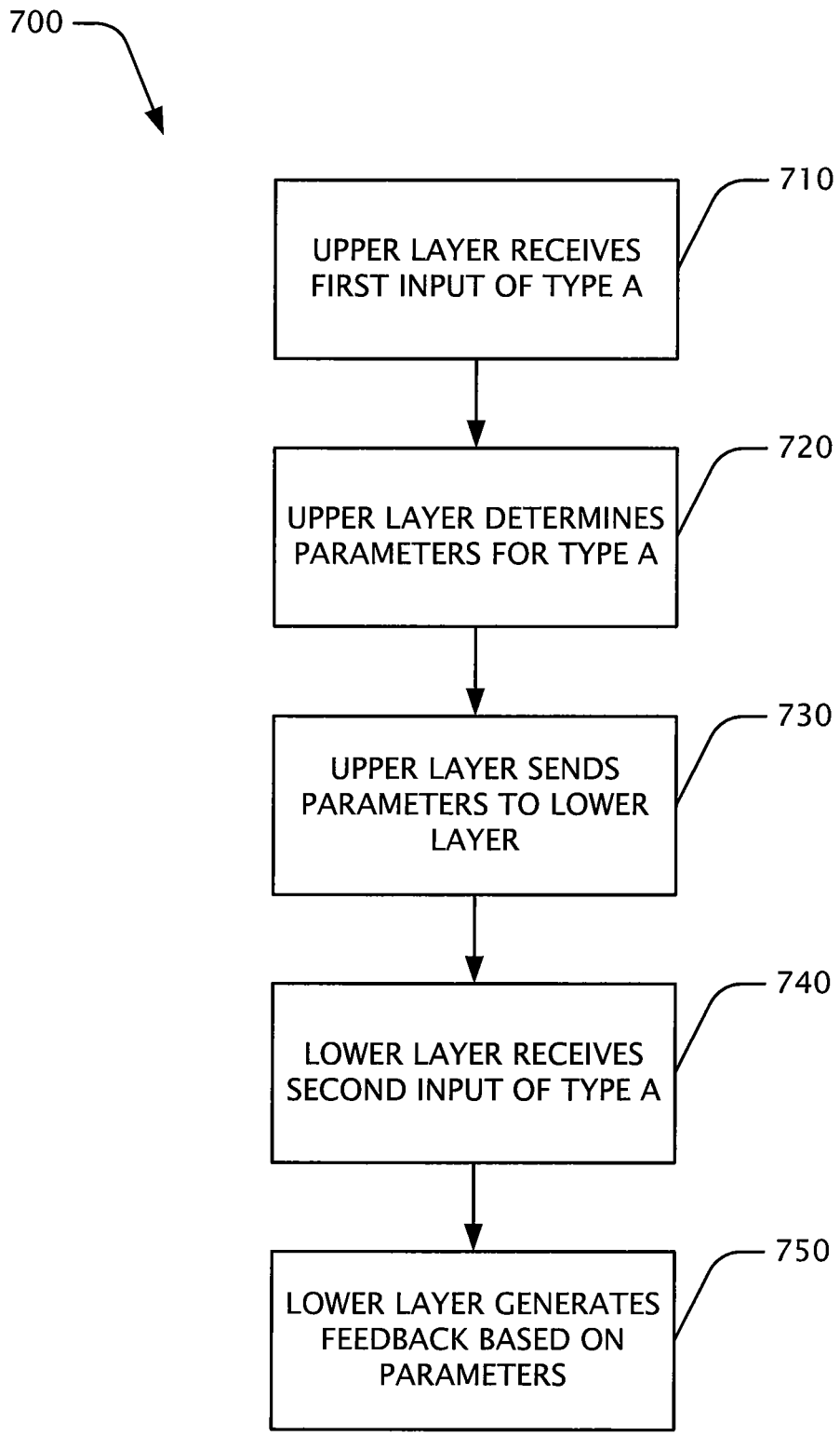
FIG. 7 shows a block diagram of an exemplary embodiment of a method for reducing feedback latency.

A block diagram of another exemplary embodiment of a method 700 for reducing feedback latency appears in FIG. 7. The method 700 can be implemented using, for example, a system similar to the system 600. In a method act 710, the component 602 executing in the upper layer 612 receives a first input of a given type (referred to as "type A" in this exemplary embodiment). Generally, the input reaches the upper layer 612 and the component 602 after being passed along by one or more lower layers, including the lower layer 614, for example. Thus, at least some of the lower layers are also aware of the input.

In a method act 720, based at least in part on the received input of type A, the component 602 generates the one or more feedback parameters 670, which at least partially describe the input's corresponding feedback. As an example, if the input indicates that a user interface element on a screen should be scrolled up or down on the screen, the feedback parameters 670 include information about how much the element should move and/or how quickly the element should move. If the input relates to scrolling a user interface list in a display, the parameters can include the boundaries of the list, how far the list can be scrolled, and/or whether the list should be shown as exhibiting "inertia" (e.g., a resistance to change in movement speed and/or direction, similar to that of a physical object). Other parameters can describe the acceleration with which a user interface element moves across a display, how a user interface element acts when it reaches a boundary (e.g., the edge of the display) (referred to herein as "boundary feedback"), or any interaction that the element has with one or more other user interface elements (e.g., displaying the element as bouncing off of another element). In some embodiments, the parameters comprise one or more numerical coefficients (including multiple coefficients for a given parameter). The parameters can further comprise: one or more rules that describe how to react to an input; a description of a state machine used for responding to the input; and/or a script to be interpreted in a layer (e.g., in a render layer) that analyzes input and produces appropriate feedback.

Once the feedback parameters 670 have been generated, they are passed to the feedback generation component 608 in the lower layer 614 in a method act 730. In at least some embodiments, feedback is not generated for the first input of type A. This can be, for example, because of the time required to determine the parameters 670. However, at least in cases where inputs are provided in relatively rapid succession (e.g., as an input stream), not generating feedback for the first input does not noticeably affect the user's experience with the system 600.

In a method act 740, a second input of type A is received by the system 600 by the lower layer. (In at least some embodiments, where the inputs are received as input streams, this second input is identified as being of type A according to a stream ID. Thus, the first and second inputs of type A are in the same input stream.) This time, in a method act 750, the input is processed by the feedback generation component 608 according to the parameters 670 to produce the corresponding feedback. Thus, once the first input of type A is used to generate corresponding feedback parameters, feedback for further inputs of type A can be handled by the lower layer, which can provide the feedback more quickly than the upper layer. Generally speaking, the input parameters 670 are based on prior input, and the parameters are then used to generate feedback for one or more later inputs.

In at least some cases, the disclosed embodiments can provide a more responsive user experience without having to use more powerful hardware.

In view of the many possible embodiments to which the principles of the disclosed technologies may be applied, it should be recognized that the illustrated embodiments are only examples of the technologies and should not be taken as limiting the scope of the invention. Rather, the scope of the invention is defined by the following claims. I therefore claim as my invention all that comes within the scope of these claims.

I claim:

1. A computer-implemented method comprising:
determining feedback for input data received at a lower-layer software component in a software system, the system comprising a plurality of software layers, the feedback being determined based at least in part on one or more feedback parameters provided by an upper-layer software component in the system and using the lower-layer software component, the one or more feedback parameters having been provided by the upper-layer software component prior to the receipt of the input data by the lower-level software component and the one or more feedback parameters having been further determined by a software component operating in a software layer between a layer in which the lower-layer software component operates and a layer in which the upper-layer software component operates, so that the one or more feedback parameters remain in the lower-layer software component; and
providing at least a portion of the input data to the upper-layer software component for modifying the feedback for future inputs;
the upper-layer software component and lower-layer software component being within a same application, wherein the upper-layer software component is an application layer and the lower-layer software component is a rendering layer for rendering the feedback on a display and the feedback is generated by the lower-layer software component using a combination of the feedback parameters provided by the upper-layer software component and the input data received in the lower-layer software component.

2. The computer-implemented method of claim 1, further comprising receiving the one or more feedback parameters from the upper-layer software component using the lower-layer software component.

3. The computer-implemented method of claim 1, the feedback parameters having been determined by the upper-layer software component based at least in part on previous input data for which previous feedback was determined.

4. The computer-implemented method of claim 1, the feedback parameters having been provided by the upper-layer software component in response to starting the software system, accessing a document with the software system, or using a user interface with the software system.

5. The computer-implemented method of claim 1, further comprising modifying a user interface element on an electronic device display based at least in part on the feedback determined using the lower-layer software component.

6. The computer-implemented method of claim 1, the upper-layer software component and the lower-layer software component executing in different threads.

7. The computer-implemented method of claim 1, the upper-layer software component and the lower-layer software component executing in different processes.

8. The computer-implemented method of claim 1, the one or more feedback parameters comprising at least one of a group consisting of an inertia parameter, a boundary parameter and a boundary feedback parameter.

9. The computer-implemented method of claim 1, further comprising determining that the feedback parameters are available for the received input data.

10. The computer-implemented method of claim 1, the feedback being determined without sending the input data to the upper-layer software component.

11. The computer-implemented method of claim 1, the providing at least a portion of the input data to the upper-layer software component comprising:
providing only some of the input data to the upper-layer software component.

12. A system comprising:
a processor; and
one or more computer-readable media having encoded thereon instructions which, when executed by the processor, cause the processor to perform a method, the method comprising,
generating feedback for a user interface element, the feedback being generated in a first software component for a later input based at least in part on one or more feedback parameters retained in the first software component and provided by a second software component, the feedback parameters having been provided based on an earlier input and before receipt by the system of the later input, wherein exchanging data between the first and second software components requires crossing one or more thread boundaries, and wherein the first software component and the second software component execute in separate software layers in the system, the separate software layers having different abstraction levels; and
executing a default behavior stored in the first software component for an input for which a corresponding feedback parameter is unavailable;
wherein the first software component and second software components are different layers of a same application, and the first software component is a rendering layer for displaying the user interface element, the first software component using the one or more feedback parameters received from the second software component and the user interface element for generating the feedback.

13. The system of claim 12, the method further comprising generating the feedback parameters using the second software component.

14. One or more computer-readable storage memory having encoded thereon instructions which, when executed by a computer, cause the computer to perform a method in a system having at least an upper software layer and a lower software layer, the method comprising:
receiving, at the upper software layer, a description of a first user input of a given type, the upper software layer comprising an application layer;
generating, using the upper software layer, one or more transformations for producing feedback corresponding to the first user input of the given type;
passing the generated one or more transformations to the lower software layer, the lower software layer comprising a rendering layer, wherein the application layer and rendering layer are in a same application, but the application layer and the rendering layer are at different levels of abstraction within the same application;
saving the one or more transformations in the lower software layer for use with future inputs of the given type;
receiving, at the lower software layer, a description of a second user input of the given type; and
generating, using the saved one or more transformations in the lower software layer, feedback for the second user input of the given type wherein at least a portion of the second user input of the given type is passed to the upper software layer and wherein the at least portion of the second user input of the given type is used to provide a modified one or more transformations to the lower software layer;

wherein a default behavior is stored for use by the lower software layer for user input for which feedback is unavailable; and wherein the feedback is for displaying a user interface element and the lower software layer is for displaying the user interface element in response to receiving the second user input.

* * * * *